United States Patent
Khangaonkar et al.

(10) Patent No.: US 8,549,144 B2
(45) Date of Patent: Oct. 1, 2013

(54) COMMON CONFIGURATION FRAMEWORK FOR APPLICATIONS TO CONFIGURE DATABASE OBJECTS AND RESOURCES

(75) Inventors: Manoj Khangaonkar, Pleasanton, CA (US); Wen Chao Li, Beijing (CN); Weixin Xu, Sunnyvale, CA (US); Kai Mike Zhang, Lake Oswego, OR (US)

(73) Assignee: International Business Machines Corporation, Armonk, NY (US)

( * ) Notice: Subject to any disclaimer, the term of this patent is extended or adjusted under 35 U.S.C. 154(b) by 1540 days.

(21) Appl. No.: 11/849,201

(22) Filed: Aug. 31, 2007

(65) Prior Publication Data
US 2009/0063563 A1 Mar. 5, 2009

(51) Int. Cl.
*G06F 15/173* (2006.01)
(52) U.S. Cl.
USPC .......... 709/225; 709/221; 709/223; 709/232; 707/999.1
(58) Field of Classification Search
USPC ................................ 709/227–229
See application file for complete search history.

(56) References Cited

U.S. PATENT DOCUMENTS

| | | | |
|---|---|---|---|
| 5,805,889 A | 9/1998 | Van De Vanter | |
| 6,256,773 B1 | 7/2001 | Bowman-Amuah | |
| 7,194,730 B2 | 3/2007 | Pramberger | |
| 7,219,344 B2 | 5/2007 | Chenelle et al. | |
| 7,225,240 B1 | 5/2007 | Fox et al. | |
| 2002/0019822 A1* | 2/2002 | Seki et al. | 707/10 |
| 2004/0268298 A1 | 12/2004 | Miller et al. | |
| 2005/0066155 A1* | 3/2005 | Dutt et al. | 713/1 |
| 2006/0101375 A1 | 5/2006 | Loughlin et al. | |

\* cited by examiner

*Primary Examiner* — Ian N Moore
*Assistant Examiner* — Jackie Zuniga
(74) *Attorney, Agent, or Firm* — David W. Victor; Konrad, Raynes, Davda & Victor LLP

(57) ABSTRACT

Provided are a method, system, and article of manufacture for a common configuration framework for applications to configure database objects and resources. configuration interfaces are maintained for a plurality of different database types, wherein each configuration interface implements a database configuration operation with respect to a database of one database type. A configuration request is received from an application indicating a database type, database name, and a database configuration operation. A determination is made of one of the configuration interfaces for the requested database type to implement the requested configuration operation with respect to the database having the database name. The determined configuration interface is invoked with the requested database name to perform the requested configuration operation with respect to the database name.

30 Claims, 6 Drawing Sheets

Configuration Request

Configuration Mapping

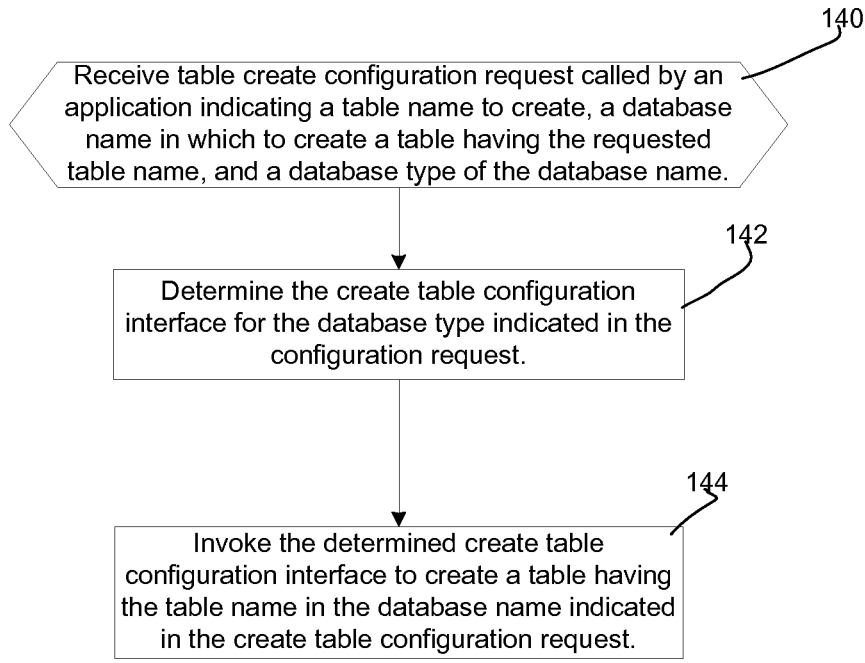
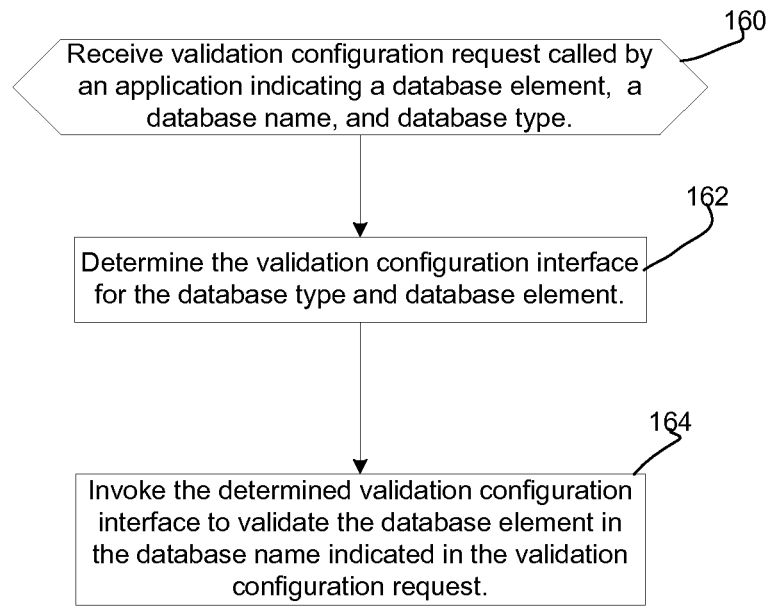

COMMON CONFIGURATION FRAMEWORK FOR APPLICATIONS TO CONFIGURE DATABASE OBJECTS AND RESOURCES

BACKGROUND OF THE INVENTION

1. Field of the Invention

The present invention relates to a method, system, and article of manufacture for a common configuration framework for applications to configure database objects and resources.

2. Description of the Related Art

Business applications may consist of components that perform certain functions for the business applications. Certain of the component functions may be programmed to interact with different heterogeneous databases and data stores. The component functions may need to perform database configuration operations with respect to different heterogeneous databases, such as create databases, create database tables, validate database elements, upgrade database elements, etc. The application developer must code the different component functions using database specific configuration commands to configure the needed database resources.

As the number of available heterogeneous databases increases in a computing environment, such as a business application environment, the application developer needs to write code to perform configuration operations for all these different databases. Although there are standards for query languages that most databases support, with respect to database configuration and setup operations, each database/vendor provides its own configuration code. In a traditional tightly coupled system where an application has access to numerous heterogeneous systems, the application developer has to build all database specific code and scripts into each application component which is a time consuming and error-prone process.

There is a need in the art for improved techniques for configuring database resources for application components.

SUMMARY

Provided are a method, system, and article of manufacture for a common configuration framework for applications to configure database objects and resources. Configuration interfaces are maintained for a plurality of different database types, wherein each configuration interface implements a database configuration operation with respect to a database of one database type. A configuration request is received from an application indicating a database type, database name, and a database configuration operation. A determination is made of one of the configuration interfaces for the requested database type to implement the requested configuration operation with respect to the database having the database name. The determined configuration interface is invoked with the requested database name to perform the requested configuration operation with respect to the database name.

BRIEF DESCRIPTION OF THE DRAWINGS

FIG. 6 illustrates an embodiment of operations to process a table create configuration request indicating a table name to create for a database name and a database type.

FIG. 7 illustrates an embodiment of operations to process a validation configuration request for a database element for a database name and database type.

DETAILED DESCRIPTION

Figure 1:
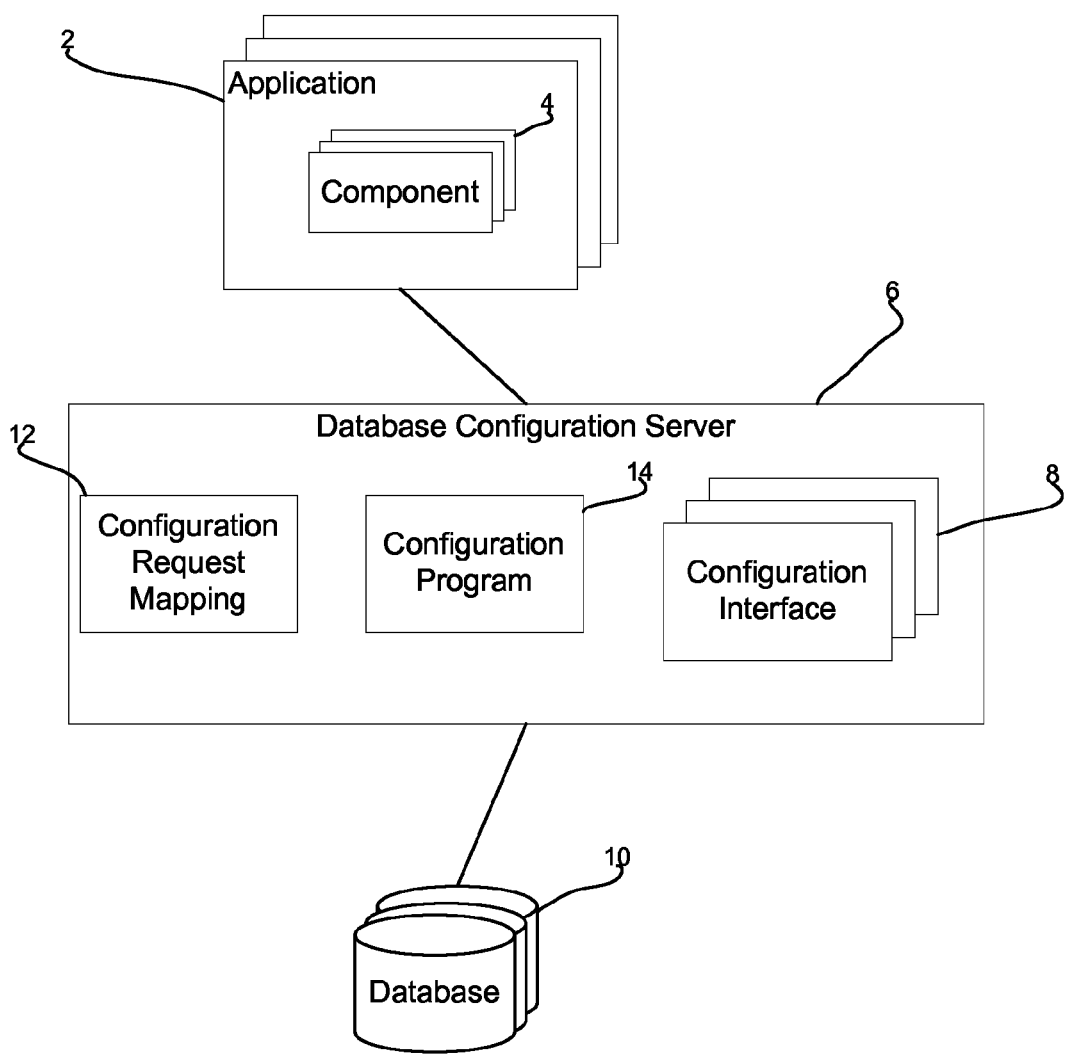
FIG. 1 illustrates an embodiment of a computing environment.

FIG. 1 illustrates an embodiment of a computing environment, such as a business applications environment. A plurality of applications 2 each include one or more components 4 that perform certain functions for the applications 2. The applications 2 may comprise business service products, where the components 4 in each application 2 comprises a function block to perform a specific task or operation. The components 4 may communicate database configuration requests to a database configuration server 6. The database configuration server 6 implements a common database configuration framework by providing the components 4 access to configuration interfaces 8 that may be used to perform database configuration operations with respect to heterogeneous databases 10. The heterogeneous databases 10 may comprise databases, component managers or data stores from different vendors and/or different types of database products from a same vendor. The databases 10 may be used for business operations, such as financial transactions, sales orders, etc.

The database configuration server 6 maintains a configuration request mapping 12 that is used to map a generic configuration request from an application component 4 to perform a specific database configuration. The database configuration server 6 further includes a configuration program 14 that processes the configuration request mapping 12 to determine a configuration interface 8 to use to perform an application component 4 requested configuration operation. A database configuration operation may comprise an operation to create a database 10, create or delete a table in a database 10 of a specified database type, validate the presence and operability of a database element, such as a password used to access a database 10, database table or object, a driver used to access the database, etc., and an upgrade of a version of a database element, such as a table, in the database 10 to a higher version of the database 10. In this way, the common database configuration framework implemented by the database configuration server 6 abstracts the database configuration operations for the applications 2 so that applications need only provide a generic database configuration request not specific to a particular database type, and the common database configuration framework will implement that generic database configuration request for the specified database and database type. Thus, each configuration interface 8 provides an implementation of a generic configuration request specific to a particular database type, including commands and application program interfaces (API), scripts, etc., specific to that database type.

The applications 2, database configuration server 6, and databases 10 may be implemented in a single computer system or distributed across multiple computer systems that communicate over a network or common bus interface.

Figure 2:
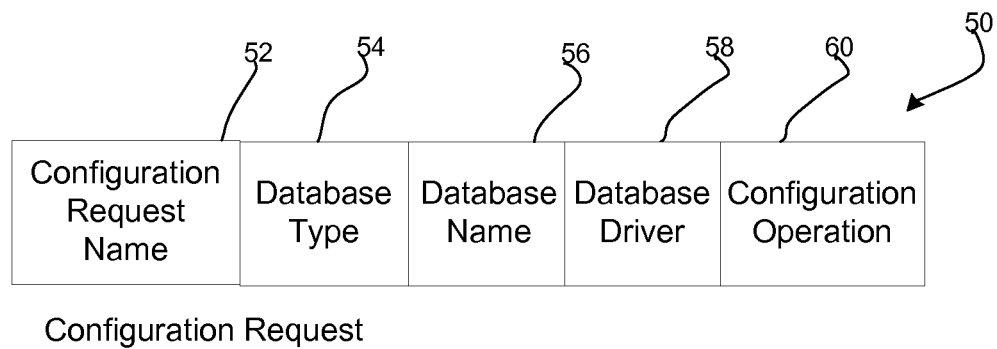
FIG. 2 illustrates an embodiment of a configuration request.

FIG. 2 illustrates an embodiment of a configuration request 50 invoked by the components 4 to the database configuration server 6, which includes a configuration request name 52, a database type 54 for which the configuration operation is performed, a database name 56 to which the configuration operation is directed, a database driver 58 to use for the operation, and a configuration operation 60. The configuration operation 60 may be indicated in the configuration request name 52. The configuration request 50 may further include additional parameters for the configuration operation to perform, such as tables to create or delete, database elements to validate, upgrade versions, etc.

Figure 3:
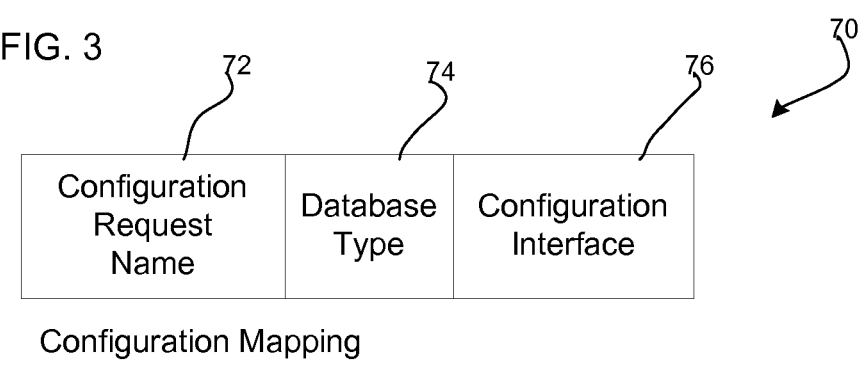
FIG. 3 illustrates an embodiment of a configuration mapping.

FIG. 3 illustrates an embodiment of a configuration mapping 70 maintained in the configuration request mapping 12, which includes a configuration request name 72 that may be invoked by an application component 4, a database type 74, and one or more configuration interfaces 76 to invoke to perform the configuration operation 60 associated with the configuration request name 72 for the database type 74 specified in the configuration request 50 database type 54.

Figure 4:
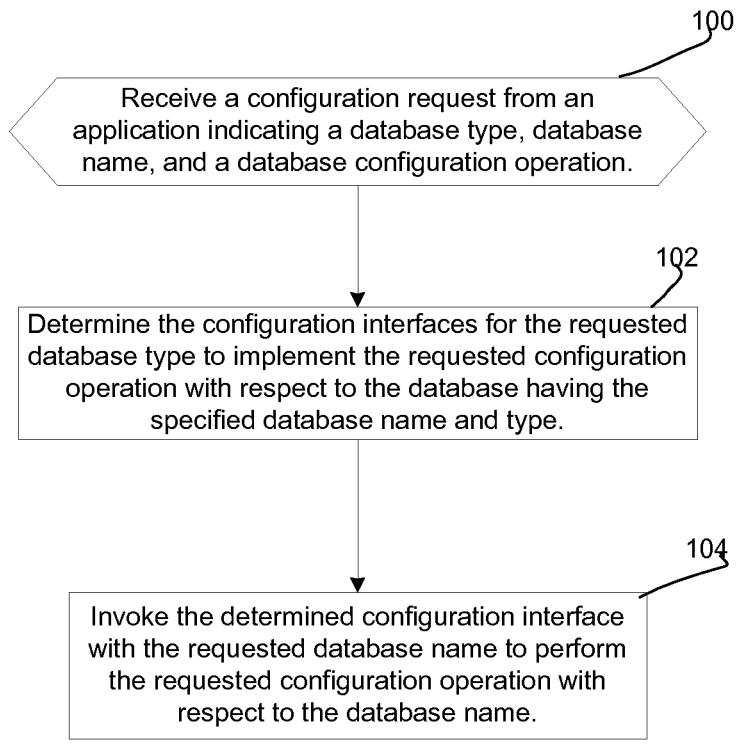
FIG. 4 illustrates an embodiment of operations to process a configuration request for a database type, database name, and database configuration operation.

FIG. 4 illustrates an embodiment of operations performed by the configuration program 14 in the database configuration server 6 to process a configuration request 50 invoked by an application component 4. Upon receiving (at block 100) a configuration request 50 from an application component 4 indicating a database type 54, database name 56, and a database configuration operation 60, the configuration program 14 determines (at block 102) the one or more configuration interfaces 8 for the requested database type 54 to implement the requested configuration operation 60 with respect to the database 10 having the database name 56. The configuration interfaces 8 for the specified database type 54 may be determined from the configuration request mapping 12 by finding the configuration mapping 70 (FIG. 3) having a configuration request name 72 matching the configuration request name 52 invoked by the application component 4. The configuration program 14 invokes the one or more configuration interfaces 76 with the requested database name 10 to perform the requested configuration operation with respect to the database name 10. When invoking the configuration interface 8, the configuration program 14 may include database specific parameters in the configuration interface 8 needed to perform the requested operation with respect to the specific database type, such as parameters not common across the heterogeneous databases 10.

Figure 5:
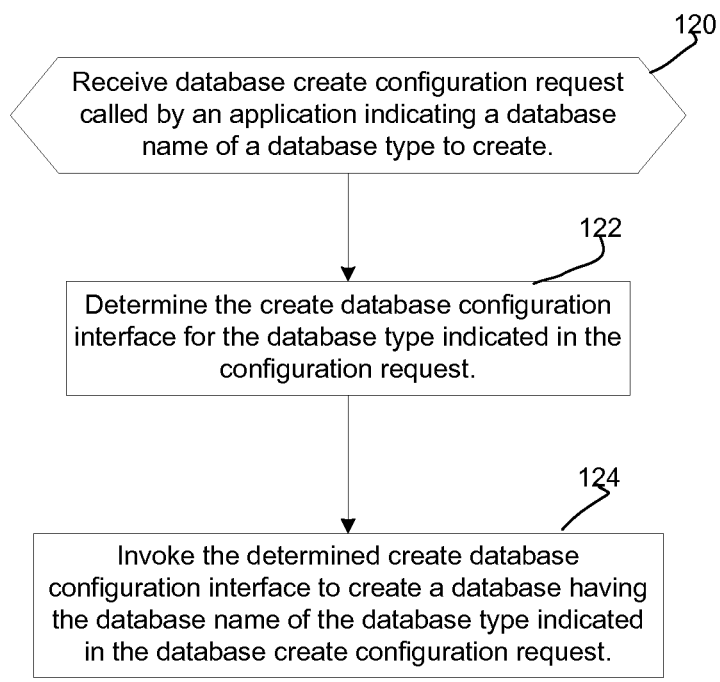
FIG. 5 illustrates an embodiment of operations to process a database create configuration request indicating a database name of a database type to create.

FIG. 5 illustrates an embodiment of operations performed by the configuration program 14 to process a database create configuration request 50 invoked by an application component 4 to create a database 10 for a specified database type 54. Upon receiving (at block 120) a database create configuration request called by an application component 4 indicating a database name 56 of a database type 54 to create, the configuration program 14 determines (at block 122) the create database configuration interface 8 for the database type 54 indicated in the received configuration request 50. The appropriate database configuration interface 8 may be determined in the configuration interface field 76 of the configuration mapping 70 having a configuration request name 72 matching the name of the create database configuration request and the database type 74 (FIG. 3) indicated in the request 50 in fields 52 and 54. The configuration program 14 invokes (at block 124) the determined create database configuration interface 8 to create a database 10 having the database name 56 of the database type 54 indicated in the database create configuration request.

FIG. 6 illustrates an embodiment of operations performed by the configuration program 14 to process a table create configuration request 50 invoked by an application component 4 to create a table in a database 10 of a specified database type 54. Upon receiving (at block 140) a table create configuration request 50 called by an application component 4 indicating a table name to create, a database name in which to create a table having the requested table name, and a database type of the database name, the configuration program 14 determines (at block 142) the create table configuration interface 8 for the database type 54 indicated in the configuration request 50, which may be determined from the configuration request mapping 70 having a matching configuration request name 72 and database type 74. The configuration program 14 invokes (at block 144) the determined create table configuration interface 8 to create a table having the table name in the database name indicated in the create table configuration request.

FIG. 7 illustrates an embodiment of operations performed by the configuration program 14 to process a validation configuration request 50 invoked by an application component 4 to validate a database element in a database 10 of a specified database type 54. Upon receiving (at block 160) a validation configuration request called by an application 2 indicating a database element, a database name 56, and database type 54, the configuration program 14 determines (at block 162) the validation configuration interface 8 for the database type 54 and database element indicated in the configuration request, which may be determined from the configuration request mapping 70 having a matching configuration request name 72 and database type 74. The configuration program 14 invokes (at block 162) the determined validation configuration interface 8 to validate the database element in the database name indicated in the validation configuration request. The database element being validated and available for use may comprise a database table, database object, database name, password for a database, etc.

Figure 8:
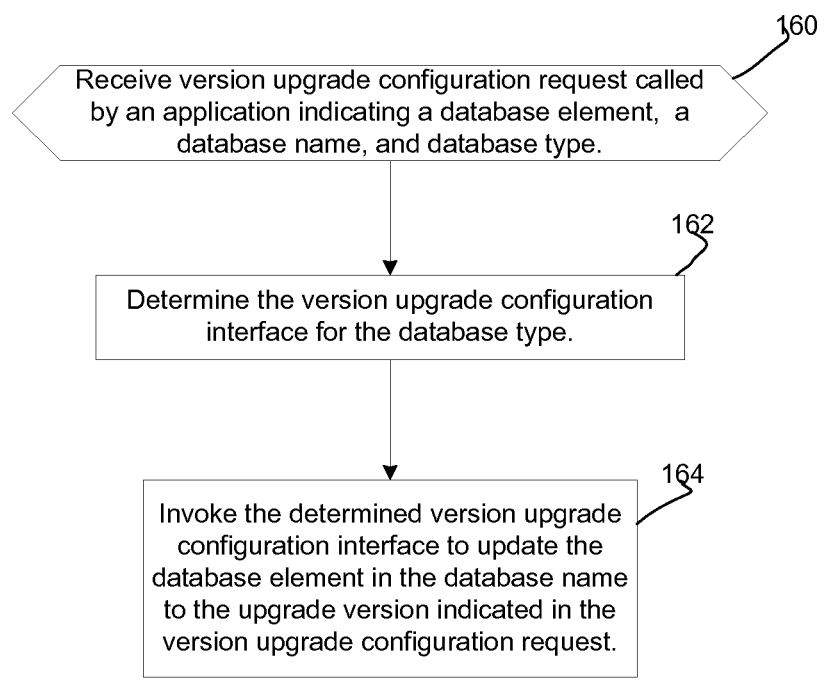
FIG. 8 illustrates an embodiment of operations to process a version upgrade configuration request called to upgrade a database element for a database name and database type.

FIG. 8 illustrates an embodiment of operations performed by the configuration program 14 to process a request to upgrade a database element to a higher version of the specified database type validation configuration request 50 invoked by an application component 4 to validate a database element in the database name 56 of the specified database type 54. Upon receiving (at bock 180) a version upgrade configuration request 50 called by an application component 4 indicating a database element, a database name 56, a database type 58 and an upgrade version to which to upgrade the database element, the configuration program 14 determines (at block 182) the version upgrade configuration interface 8 for the database type 58, which may be determined from the configuration request mapping 70 having a matching configuration request name 72 and database type 74. The configuration program 14 invokes (at block 184) the determined version upgrade configuration interface 8 to update the database element in the database name 56 to the version upgrade indicated in the version upgrade configuration request.

The common database configuration framework abstracts and encapsulates database specific configuration operations and tasks as configuration interfaces 8 accessible through the generic configuration requests the components 4 may invoke during build time and runtime operations. In certain embodiments, the configuration interfaces 8 may be exposed or published as services to application components 4 through build-time APIs or runtime interfaces which describe inputs needed from users in order to invoke the configuration interfaces 8 as services. For instance, the configuration interfaces may be exposed as services and accessible in a Service Component Architecture. The inputs the user provides with the service call may comprise the common information that would be provided with the configuration request 50, including database type, name, database element subject to the configuration operation, device driver, authentication information, etc. and other necessary parameters to invoke the common interface and service. The configuration program 14 may further supplement the application invocation of the service with database specific parameters so that database specific tasks will be handled inside the framework and hidden from applications and other end users.

The configuration requests 50 may be invoked by the application components 4 or end users via scripting application program interfaces (APIs), programming language APIs that may be called directly by components 4, by stand alone tools and utilities invoked by end users, published services, etc.

Described embodiments abstract the common tasks associated with the database configurations to form a common database configuration framework implemented in the database configuration server to decouple applications 4 and heterogeneous databases 10 to release the applications component 4 developers and end users from database specific configuration tasks. This common framework simplifies database configuration operations for application developers to allow them to focus on the business side of problems and, at the same time, allows expert-built and repeatedly tested database specific code in the configuration interfaces 8 to be reused across applications 2 and components 4 and end users.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The described operations may be implemented as services maintained in reusable components. The operations may be implemented as services and published as service interfaces. In such service oriented environment, the described operations can be used by applications by service lookup and invocation, whatever technology the application is using (Java, C++, Python, Ruby, etc).

Further, the described embodiments may be implemented in a Service Oriented Architecture, where various applications are integrated together. The database configuration framework is generally available as a service, so each application can easily make use of the framework, especially at runtime.

Figure 9:
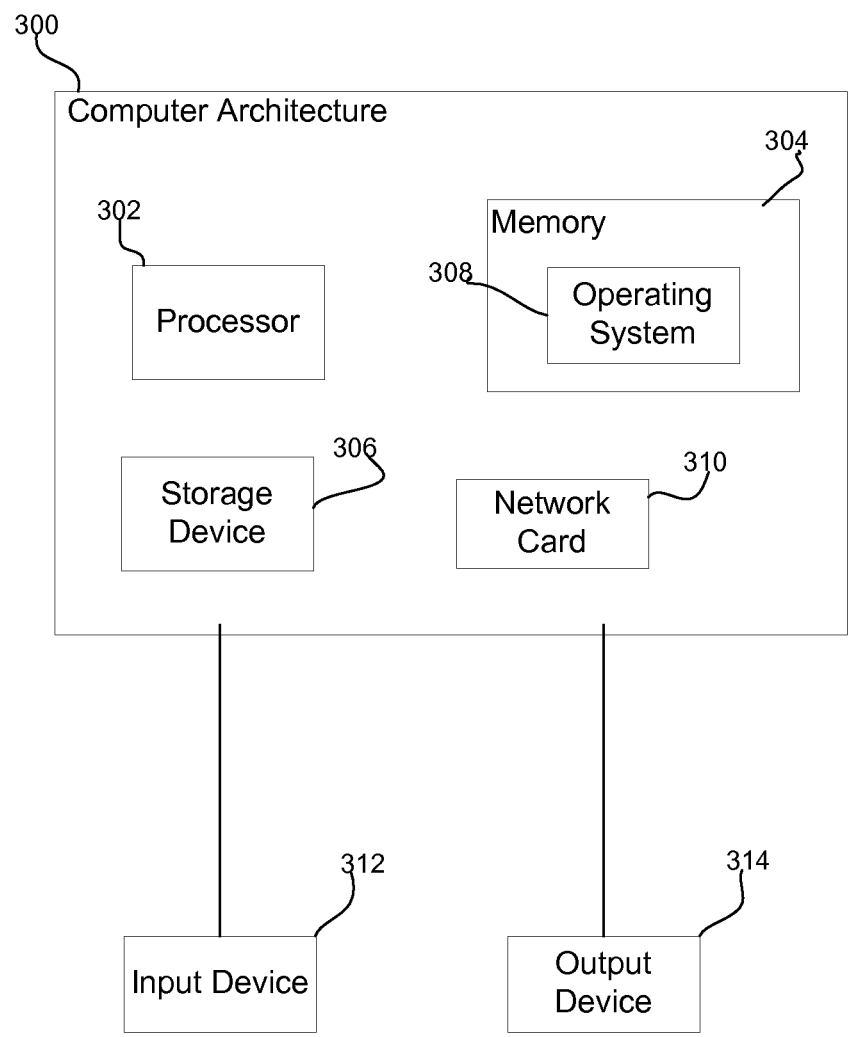
FIG. 9 illustrates an embodiment of a computer architecture that may be used with the described embodiments.

FIG. 9 illustrates an embodiment of a computer architecture 300 in which the components of FIG. 1, including the application 2, database configuration server 6, and databases 10 may be implemented. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308, device drivers and application programs, in the storage 306 are loaded into the memory 304 and executed by the processor 302 in a manner known in the art. The architecture further includes a network card 310 to enable communication with a network. An input device 312 is used to provide user input to the processor 312, and may include a keyboard, mouse, pen-stylus, microphone, touch sensitive display screen, or any other activation or input mechanism known in the art. An output device 314 is capable of rendering information transmitted from the processor 312, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining configuration interfaces for a plurality of different database types, wherein each configuration interface implements a database configuration operation with respect to a database of one database type;
   maintaining a configuration request mapping providing configuration mappings, each configuration mapping indicating a configuration request name and at least one of the configuration interfaces for a database type to invoke to perform a configuration operation associated with the configuration request name for the database type, wherein configuration mappings are provided for different database types to perform the configuration operation associated with one configuration request name;
   receiving a configuration request from an application indicating a configuration request name, database type, database name, and a generic database configuration operation not specific to a particular database type;
   determining the configuration mapping in the configuration request mapping having a database type and configuration request name matching the requested database type and the requested configuration request name for the generic database configuration operation to implement the requested configuration operation with respect to the database having the database name;
   determining the configuration interface for the determined configuration mapping; and
   invoking the determined configuration interface with the requested database name to perform the requested configuration operation with respect to the database name.

2. The method of claim 1, wherein the configuration interfaces implement build time configuration operations to configure database resources for the database accessible to applications during runtime operations.

3. The method of claim 2, further comprising:
   accessing, by a plurality of applications executing in a runtime environment, the built database resources to access and perform operations with respect to the databases of the different database types.

4. The method of claim 2, further comprising:
   publishing services associated with the configuration interfaces that are called by the applications directly as a service for the database types; and
   invoking, by the applications, the services with inputs comprising the configuration request to perform the requested generic configuration operation implemented by the services with respect to the requested database name of the database type and generic configuration operation associated with the configuration interface associated with the invoked service.

5. The method of claim 2, wherein the configuration requests called by the application include database create configuration requests indicating a database name and database type to create, wherein determining one of the configuration interfaces for the database create configuration request comprises determining one configuration interface that is invoked to create a database having the database name of the database type indicated in the database create configuration request.

6. The method of claim 2, wherein the configuration requests called by the application include table create configuration requests indicating a table name to create, a database name in which to create a table having the requested table name, and a database type of the database name, wherein determining one of the configuration interfaces for the table create configuration request comprises determining one configuration interface operation that is invoked to create a table having the table name in the database name of the database type indicated in the table create configuration request.

7. The method of claim 2, wherein the configuration requests called by the application include version upgrade configuration requests indicating a database element to upgrade, a version upgrade, a database name in which to upgrade the database element to the version upgrade, and a database type, wherein determining one of the configuration interfaces for the version upgrade configuration request comprises determining one configuration interface that is invoked to upgrade the database element to the version upgrade for the database type indicated in the version upgrade configuration request.

8. The method of claim 1, wherein the configuration requests called by the application include validation configuration requests indicating a database element to validate, a database name to be validated, and a database type of the database name, wherein determining one of the configuration interfaces for the validation configuration request comprises determining one validation configuration interface that is invoked to validate the database element for the database name of the database type indicated in the validation create configuration request.

9. The method of claim 8, wherein the determined database element to validate for use during runtime operations includes at least one of a password, database name, and database drivers.

10. The method of claim 1, wherein the database types include databases from different vendors having different database formats and configurations.

11. A system in communication with databases of different database types and applications, comprising:
   a processor; and
   a computer readable storage device storing:
      configuration interfaces for a plurality of different database types, wherein each configuration interface implements a database configuration operation with respect to a database of one database type;
      a configuration request mapping providing configuration mappings, each configuration mapping indicating a configuration request name and at least one of the configuration interfaces for a database type to invoke to perform a configuration operation associated with the configuration request name for the database type, wherein configuration mappings are provided for different database types to perform the configuration operation associated with one configuration request name;
      a configuration program executed by the processor operations, the operations including:
         receiving a configuration request from one of the applications indicating a configuration request name, database type, database name, and a generic database configuration operation not specific to a particular database type;
         determining the configuration mapping in the configuration request mapping having a database type and configuration request name matching the requested database type and the requested configuration request name for the generic database configuration operation to implement the requested configuration operation with respect to the database having the database name;
         determining the configuration interface for the determined configuration mapping; and
         invoking the determined configuration interface with the requested database name to perform the requested configuration operation with respect to the database name.

12. The system of claim 11, wherein the configuration interfaces implement build time configuration operations to configure database resources for the database accessible to applications during runtime operations.

13. The system of claim 12, wherein the applications executing in a runtime environment access the built database resources to access and perform operations with respect to the databases of the different database types.

14. The system of claim 12, configuration program operations further comprise:
   publishing services associated with the configuration interfaces that are called by the applications directly as a service for the database types, wherein the applications invoke the services with inputs comprising the configuration request to perform the generic configuration operation implemented by the services with respect to the requested database name of the database type and generic configuration operation associated with the configuration interface associated with the invoked service.

15. The system of claim 12, wherein the configuration requests called by the application include database create configuration requests indicating a database name and database type to create, wherein determining one of the configuration interfaces for the database create configuration request comprises determining one configuration interface that is invoked to create a database having the database name of the database type indicated in the database create configuration request.

16. The system of claim 12, wherein the configuration requests called by the application include table create configuration requests indicating a table name to create, a database name in which to create a table having the requested table name, and a database type of the database name, wherein determining one of the configuration interfaces for the table create configuration request comprises determining one configuration interface operation that is invoked to create a table having the table name in the database name of the database type indicated in the table create configuration request.

17. The system of claim 12, wherein the configuration requests called by the application include version upgrade configuration requests indicating a data base element to upgrade, a version upgrade, a database name in which to upgrade the database element to the version upgrade, and a database type, wherein determining one of the configuration interfaces for the version upgrade configuration request comprises determining one configuration interface that is invoked to upgrade the database element to the version upgrade for the database type indicated in the version upgrade configuration request.

18. The system of claim 11, wherein the configuration requests called by the application include validation configuration requests indicating a database element to validate, a database name to be validated, and a database type of the database name, wherein determining one of the configuration interfaces for the validation configuration request comprises determining one validation configuration interface that is invoked to validate the database element for the database name of the database type indicated in the validation create configuration request.

19. The system of claim 18, wherein the determined database element to validate for use during runtime operations includes at least one of a password, database name, and database drivers.

20. The system of claim 11, wherein the database types include databases from different vendors having different database formats and configurations.

21. An article of manufacture comprising a computer readable storage device storing code executed to configure resources for databases of different database types for applications, wherein the code causes operations, the operations comprising:
   maintaining configuration interfaces for a plurality of different database types, wherein each configuration interface implements a database configuration operation with respect to one of the databases of one database type;
   maintaining a configuration request mapping providing configuration mappings, each configuration mapping indicating a configuration request name and at least one of the configuration interfaces for a database type to invoke to perform a configuration operation associated with the configuration request name for the database type, wherein configuration mappings are provided for different database types to perform the configuration operation associated with one configuration request name;

receiving a configuration request from the application indicating a configuration request name, database type, database name, and a generic database configuration operation not specific to a particular database type;

determining the configuration mapping in the configuration request mapping having a database type and configuration request name matching the requested database type and the configuration request name for the requested generic database configuration operation to implement the requested configuration operation with respect to the database having the database name;

determining the configuration interface for the determined configuration mapping and invoking the determined configuration interface with the requested database name to perform the requested configuration operation with respect to the database name.

22. The article of manufacture of claim 21, wherein the configuration interfaces implement build time configuration operations to configure database resources for the database accessible to applications during runtime operations.

23. The article of manufacture of claim 22, wherein the applications executing in a runtime environment access the built database resources to access and perform operations with respect to the databases of the different database types.

24. The article of manufacture of claim 22, wherein the operations further comprise:

publishing services associated with the configuration interfaces that are called by the applications directly as a service for the database types; and invoking, by the applications, the services with inputs comprising the configuration request to perform the requested generic configuration operation implemented by the services with respect to the requested database name of the database type and generic configuration operation associated with the configuration interface associated with the invoked service.

25. The article of manufacture of claim 22, wherein the configuration requests called by the application include database create configuration requests indicating a database name and database type to create, wherein determining one of the configuration interfaces for the database create configuration request comprises determining one configuration interface that is invoked to create a database having the database name of the database type indicated in the database create configuration request.

26. The article of manufacture of claim 22, wherein the configuration requests called by the application include table create configuration requests indicating a table name to create, a database name in which to create a table having the requested table name, and a database type of the database name, wherein determining one of the configuration interfaces for the table create configuration request comprises determining one configuration interface operation that is invoked to create a table having the table name in the database name of the database type indicated in the table create configuration request.

27. The article of manufacture of claim 22, wherein the configuration requests called by the application include version upgrade configuration requests indicating a database element to upgrade, a version upgrade, a database name in which to upgrade the database element to the version upgrade, and a database type, wherein determining one of the configuration interfaces for the version upgrade configuration request comprises determining one configuration interface that is invoked to upgrade the database element to the version upgrade for the database type indicated in the version upgrade configuration request.

28. The article of manufacture of claim 21, wherein the configuration requests called by the application include validation configuration requests indicating a database element to validate, a database name to be validated, and a database type of the database name, wherein determining one of the configuration interfaces for the validation configuration request comprises determining one validation configuration interface that is invoked to validate the database element for the database name of the database type indicated in the validation create configuration request.

29. The article of manufacture of claim 28, wherein the determined database element to validate for use during runtime operations includes at least one of a password, database name, and database drivers.

30. The article of manufacture of claim 21, wherein the database types include databases from different vendors having different database formats and configurations.

* * * * *